Patented Apr. 29, 1924.

1,491,929

UNITED STATES PATENT OFFICE.

GEORGE M. SMITH AND ALVIN A. CLAASSEN, OF CHICAGO, ILLINOIS.

METHOD OF MAKING STEEL.

No Drawing.   Application filed July 26, 1922.   Serial No. 577,748.

*To all whom it may concern:*

Be it known that we, GEORGE M. SMITH and ALVIN A. CLAASSEN, citizens of the United States, residing at Chicago, in the county of Cook, State of Illinois, having jointly invented certain new and useful Improvements in Methods of Making Steel, do hereby declare that the following is a full, clear, and exact description of the same.

The invention relates to a new and improved step in the process of making steel, and particularly for utilizing low grade or cheap scrap iron in the manufacture of high grade steels.

In the manufacture of high-grade steel by the usual methods heretofore employed when scrap iron was used it was necessary to use high grade scrap which was selected so as to be as free as possible from rust or oxidation; low grade scrap irons, such for example as have large surfaces as compared to their weights, could not be used as the iron oxide that covered their surfaces was not eliminated in the furnace. By our invention low grade scrap irons can be used as it changes poor or cheap scrap to good scrap and helps to clarify or deoxidize the steel, besides making the scrap melt at lower furnace temperatures.

In carrying out our invention we take any low grade or cheap scrap, which affords large surfaces as compared to its weight, such for example as detinned metal or can scrap, and place aluminum in contact with it, and arrange these thermit ingredients or materials in any suitable manner to form a unit that will preserve them in combination until the thermit formed by the oxides and aluminum is fired by the heat of the furnace. For example, cheap scrap iron of the general character or grade above described is now put up in bundles of varying sizes and dimensions, in which form it is charged into open-hearth furnaces, and in the practice of our invention the aluminum is added to the scrap bundle in any amount and in any form that will enable it to come into combination or contact with the iron oxide of the scrap to an extent sufficient to enable these ingredients to combine when the thermit so formed is set off by the furnace heat. The aluminum may be in sheet or granular form, and its form will vary according to variations in the form of the scrap, but in any case it is desirable to have it contact with the surfaces of the scrap to as great extent as possible; preferably, the aluminum is added when the loose scrap is bundled or assembled in the unit in which it is charged into the furnace. The scrap and aluminum are formed into units which are sufficient to preserve these materials in contact when the unit is charged into the furnace and until the thermit so formed is set off by the furnace heat; any unitary form that fulfills these requirements is within the scope of our invention.

When the units are charged into the furnace the heat of the latter sets the thermic mixture in action which produces a very high temperature within the bundle or unit, so that the scrap quickly melts and at once mixes with the other materials of the bath. The iron oxide and aluminum combine, and the character of each is changed; the oxide is eliminated as slag and the aluminum passes off in the form of gas or is taken up by the slag. The reaction does not produce aluminum steel as the aluminum disappears, and the thermit action deoxidizes the steel as it frees it from impurities, while at the same time it helps the general process as it produces very high inside heat in the unit or bundle and so makes the scrap melt at lower furnace temperatures. While the units of scrap and aluminum may be charged into the bath at any time, we prefer to charge them last as this enables the steel to be made with less carbon in the original bath and also reduces the oxides of the whole bath.

By this process the scrap iron may be of the very lowest and cheapest grades, and in fact the more it is covered with rust the better will be the steel produced as the thermit reaction is accordingly greater. This reaction changes the poor or low grade scrap into high-grade scrap so that the steel produced is equal to that made with approximately equal amounts of high grade or selected scrap, and as the amount of aluminum required is not large the cost of producing high grade steel is lowered; the combined cost of the low grade scrap iron and aluminum is less than the cost of high grade scrap iron. The thermit action helps to increase the grade of the steel as it deoxidizes and clarifies it; also, by using its inside heat in the bundle or unit the scrap is melted at lower furnace temperatures and without any air-cooling at its surfaces.

In case the oxide on the scrap is insufficient to cause proper thermic action to melt the scrap the necessary amount of iron oxide may be added to the bundle to produce such thermic action.

We claim:

1. The method of making steel which consists in preparing a thermit unit of aluminum in combination with rusty scrap iron and introducing the unit into a furnace in such form as will preserve the combination of the thermic substances until the thermit is set off by the heat of the furnace.

2. The method of making steel which consists in bundling a quantity of low grade scrap iron which affords large surfaces in comparison with its weight, introducing aluminum into contact with sufficient of said surfaces to form a thermit with the iron oxide thereon, and charging the unit into a furnace.

3. The method of making steel which consists in refining a charge of iron, and introducing a thermic mixture of aluminum and low grade scrap iron into the bath toward the close of the refining action to cause the combustion of the thermit to produce inside heat in the mixture.

In testimony whereof we affix our signatures.

GEORGE M. SMITH.
ALVIN A. CLAASSEN.